United States Patent
Matsuzaki

(10) Patent No.: US 10,499,555 B2
(45) Date of Patent: Dec. 10, 2019

(54) WORK VEHICLE AND OBSTRUCTION DETECTION METHOD FOR WORK VEHICLE

(71) Applicant: Kubota Corporation, Osaka-shi (JP)

(72) Inventor: Yushi Matsuzaki, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 39 days.

(21) Appl. No.: 15/626,184

(22) Filed: Jun. 19, 2017

(65) Prior Publication Data

US 2018/0206392 A1    Jul. 26, 2018

(30) Foreign Application Priority Data

Jan. 20, 2017 (JP) .................. 2017-008337

(51) Int. Cl.
| | | |
|---|---|---|
| *A01D 75/18* | (2006.01) | |
| *A01B 76/00* | (2006.01) | |
| *G05D 1/02* | (2006.01) | |
| *A01B 69/04* | (2006.01) | |
| *B62D 49/06* | (2006.01) | |

(52) U.S. Cl.
CPC ............ *A01B 76/00* (2013.01); *A01B 69/008* (2013.01); *A01D 75/18* (2013.01); *G05D 1/021* (2013.01); *G05D 1/0212* (2013.01); *B62D 49/06* (2013.01); *G05D 1/02* (2013.01); *G05D 2201/0201* (2013.01)

(58) Field of Classification Search
CPC ...... G05D 1/0278; G05D 1/021; A01B 76/00; A01B 69/008

USPC .......... 701/50, 51, 23, 96; 340/435; 411/685
See application file for complete search history.

(56) References Cited

U.S. PATENT DOCUMENTS

| | | | | |
|---|---|---|---|---|
| 5,987,383 A | * | 11/1999 | Keller ................. | A01B 69/007 342/357.36 |
| 2007/0286475 A1 | * | 12/2007 | Sekiguchi .......... | G06K 9/00369 382/154 |

(Continued)

FOREIGN PATENT DOCUMENTS

| | | |
|---|---|---|
| EP | 3104244 | 12/2016 |
| EP | 3125061 | 2/2017 |

(Continued)

OTHER PUBLICATIONS

Extended European Search Report for corresponding EP Application No. 17175234.8-1755, dated Jan. 4, 2018.

*Primary Examiner* — Cuong H Nguyen
(74) *Attorney, Agent, or Firm* — Mori & Ward, LLP

(57) ABSTRACT

A work vehicle includes a vehicle body, at least one obstruction sensor, at least one state sensor, and circuitry. A work device is attachable to the vehicle body. The at least one obstruction sensor is provided on the vehicle body to detect an obstruction to the work vehicle. The at least one state sensor is provided on at least one of the vehicle body and the work device to detect at least one state of the vehicle body and the work device. The circuitry is configured to determine an obstruction detection area based on the at least one state detected by the at least one state sensor, and to determine whether the obstruction exists within the obstruction detection area based on a sensor signal from the at least one obstruction sensor.

17 Claims, 8 Drawing Sheets

(56) References Cited

U.S. PATENT DOCUMENTS

| | | | |
|---|---|---|---|
| 2010/0332061 A1* | 12/2010 | Forslow | B60W 10/24 701/22 |
| 2012/0089293 A1* | 4/2012 | Halder | B60W 50/0205 701/24 |
| 2016/0076223 A1* | 3/2016 | Wei | E02F 9/2029 701/50 |
| 2016/0138240 A1* | 5/2016 | Ikegami | E02F 9/2285 701/50 |
| 2018/0181143 A1* | 6/2018 | Hiramatsu | A01B 69/008 |

FOREIGN PATENT DOCUMENTS

| | | |
|---|---|---|
| JP | 2002-215238 | 7/2002 |
| JP | 2015-191592 | 11/2015 |
| WO | WO 2015/147224 | 10/2015 |

* cited by examiner

WORK VEHICLE AND OBSTRUCTION DETECTION METHOD FOR WORK VEHICLE

CROSS-REFERENCE TO RELATED APPLICATIONS

The present application claims priority under 35 U. S. C. § 119 to Japanese Patent Application No. 2017-008337, filed Jan. 20, 2017. The contents of this application are incorporated herein by reference in their entirety.

BACKGROUND OF THE INVENTION

Field of the Invention

The present invention relates to a work vehicle and an obstruction detection method for a work vehicle.

Discussion of the Background

An automatic travelling work vehicle includes an obstruction sensor configured to contactlessly detect an obstruction that can cause collision during travel. When the obstruction sensor detects an obstruction, the automatic travelling work vehicle executes avoidance steering or emergency stop to avoid collision with the obstruction.

Japanese Patent Application Laid-open No. 2002-215238 discloses an unmanned carrier configured to set an appropriate detection area for an obstruction sensor in accordance with a travel zone, and determine that an obstruction is detected if an obstruction detected by the obstruction sensor is positioned within the detection area.

Japanese Patent Application Laid-open No. 2015-191592 discloses an autonomous travelling work vehicle including an obstruction sensor and a sensitivity adjuster configured to adjust sensitivity of the obstruction sensor so as to have high sensitivity within a set work area and have low sensitivity outside the set work area.

SUMMARY OF THE INVENTION

According one aspect of to the present invention, a work vehicle includes a vehicle body, at least one obstruction sensor, at least one state sensor, and circuitry. A work device is attachable to the vehicle body. The at least one obstruction sensor is provided on the vehicle body to detect an obstruction to the work vehicle. The at least one state sensor is provided on at least one of the vehicle body and the work device to detect at least one state of the vehicle body and the work device. The circuitry is configured to determine an obstruction detection area based on the at least one state detected by the at least one state sensor, and to determine whether the obstruction exists within the obstruction detection area based on a sensor signal from the at least one obstruction sensor.

According to another aspect of the present invention, an obstruction detection method for a work vehicle includes detecting an obstruction to the work vehicle. At least one state of a vehicle body and a work device attachable to the vehicle body is detected. An obstruction detection area is determined based on the at least one state. Whether the obstruction exists within the obstruction detection area is determined.

According to further aspect of the present invention, a work vehicle includes a vehicle body, at least one obstruction sensor, at least one state sensor, area determination means, and obstruction determination means. A work device is attachable to the vehicle body. The at least one obstruction sensor is provided on the vehicle body to detect an obstruction to the work vehicle. The at least one state sensor is provided on at least one of the vehicle body and the work device to detect at least one state of the vehicle body and the work device. The area determination means are for determining an obstruction detection area based on the at least one state detected by the at least one state sensor. The obstruction determination means are for determining whether the obstruction exists within the obstruction detection area based on a sensor signal from the at least one obstruction sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
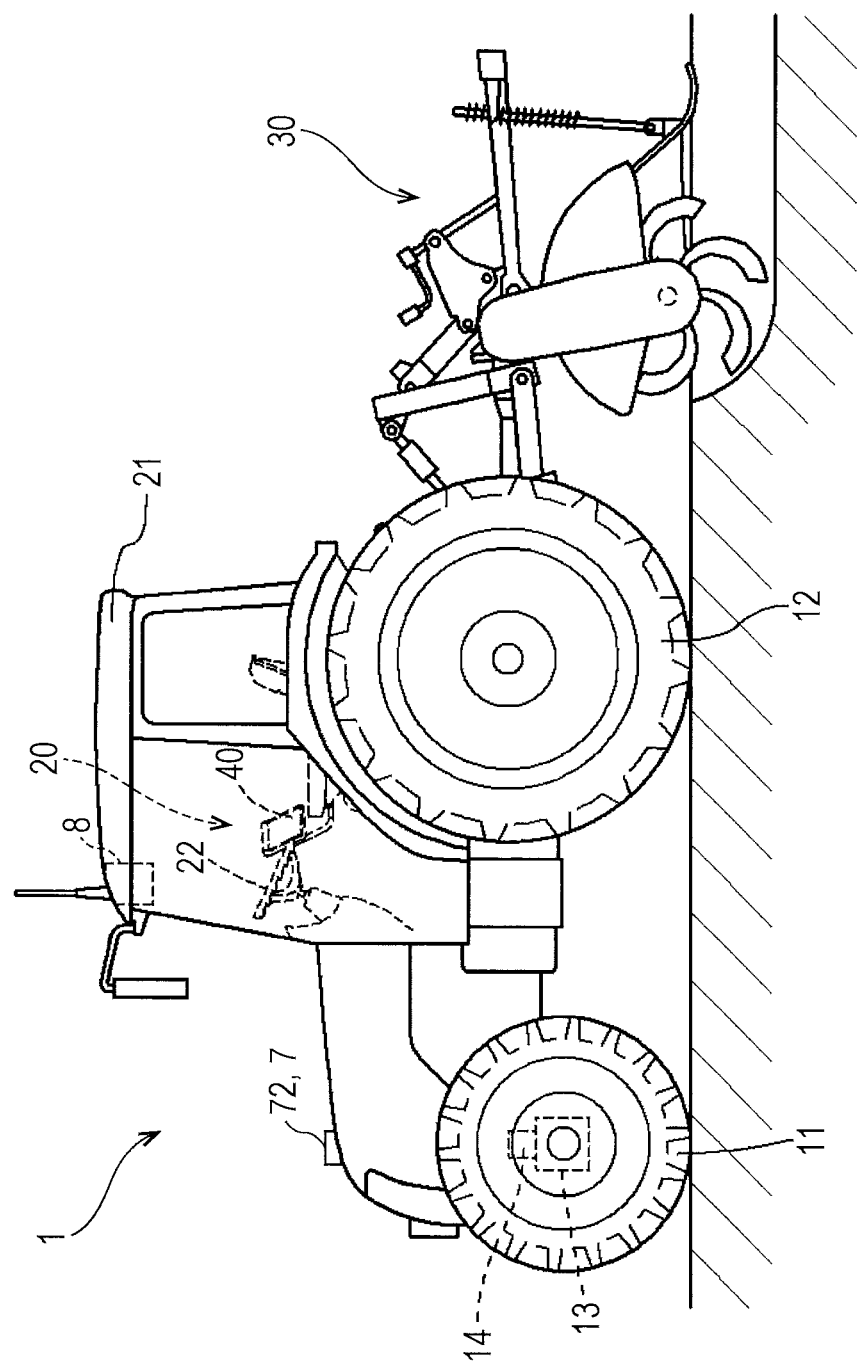
FIG. 1 is a side view of a tractor exemplifying an automatic travelling work vehicle configured to execute work travel along a travel route.

The embodiments will now be described with reference to the accompanying drawings, wherein like reference numerals designate corresponding or identical elements throughout the various drawings. In the embodiments described below, the phrase "work travel" includes a state where at least one of working while travelling, only travelling, or only working, is being executed, and a state where such work travel is temporarily stopped.

An automatic travelling work vehicle according to an embodiment of the present invention will now be described with reference to the drawings. The work vehicle according to the present embodiment is a tractor configured to execute work travel in a field (work field) separated by ridges.

As shown in FIG. 1, this tractor includes an operation section 20 at a center of a vehicle body 1 supported by front wheels 11 and rear wheels 12. The vehicle body 1 is provided therebehind with a work device 30 configured as a rotary tilling device, via a hydraulic lifting mechanism 31. The front wheels 11 function as steering control wheels, and the tractor is redirected by changing a steering angle of the front wheels. The steering angle of the front wheels 11 is changed by actuating a steering mechanism 13. The steering mechanism 13 includes a steering motor 14 for automatic steering. The front wheels 11 can be controlled by operating a steering wheel 22 disposed at the operation section 20 during manual travel. The tractor includes a cabin 21 provided with a satellite positioning module 8 configured as a global navigation satellite system (GNSS) module. The satellite positioning module 8 includes, as a constituent element, a satellite antenna configured to receive GNSS signals (inclusive of GPS signals) and attached to a ceiling area of the cabin 21. The satellite positioning module 8 can be used in combination with an inertial navigation module including a gyro acceleration sensor and a magnetic direction sensor in order for complementation of satellite navigation. The inertial navigation module can alternatively be disposed at a location different from the satellite positioning module 8. The operation section 20 includes a user operation terminal 4 connected to an on-vehicle LAN. In a case where the user operation terminal 4 is configured by a tablet computer or the like, a driver or a manager can operate the user operation terminal 4 outside the vehicle.

Figure 2:
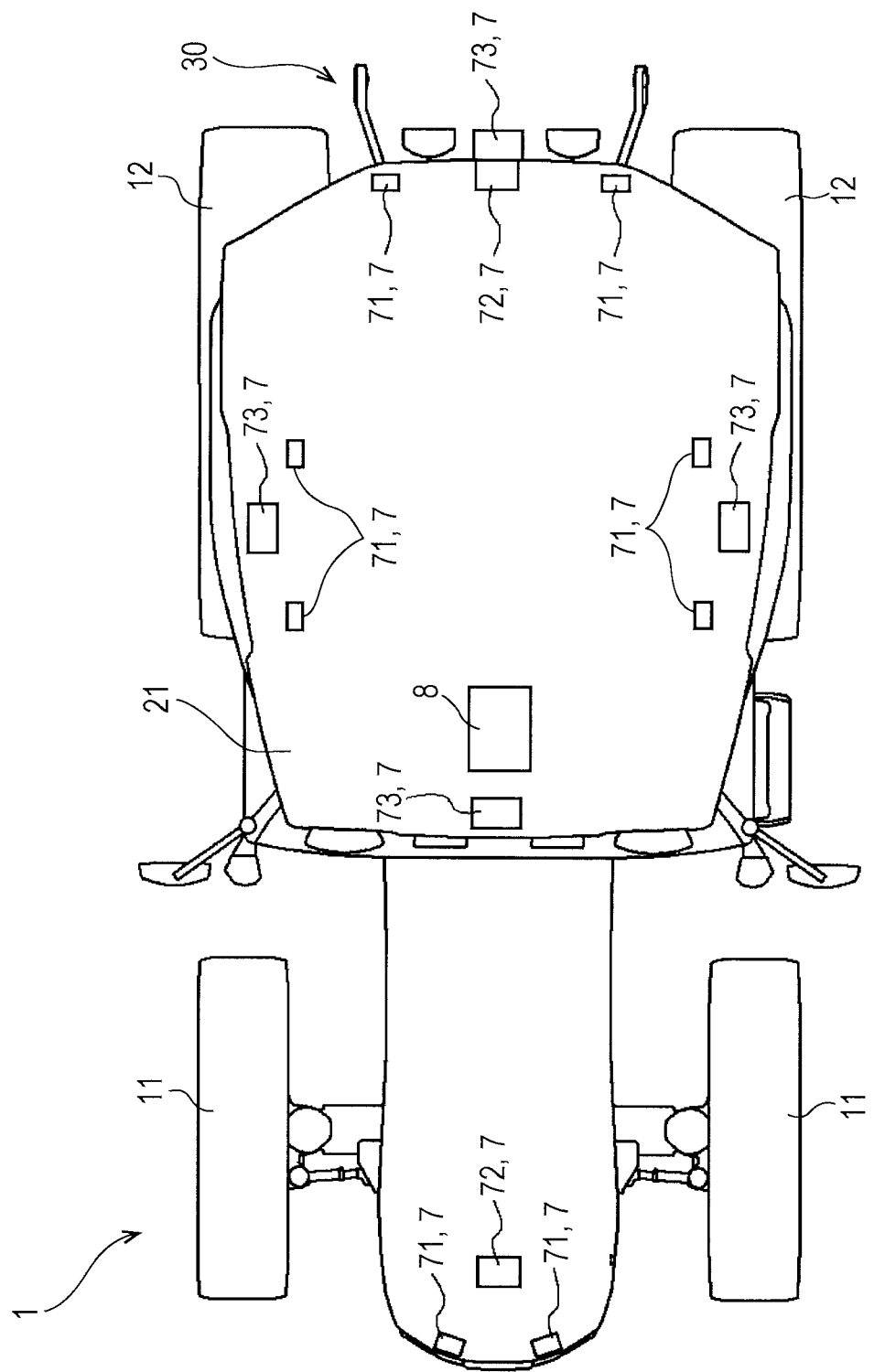
FIG. 2 is a schematic plan view of the tractor, showing obstruction detection sensors mounted on the tractor.

As schematically shown in FIG. 2, the vehicle body 1 of the tractor is equipped with obstruction sensors 7 configured to detect an obstruction disturbing travel. The obstruction sensors 7 include an ultrasonic sonar 71 and a laser scanner (LiDAR) 72 each functioning as an obstruction sensor. The vehicle body 1 is further equipped with a camera 73 used also for detection of an obstruction. There are eight ultrasonic sonars 71 in total, specifically, two each ahead, behind, on the left, and on the right of the vehicle body 1, for detection of obstructions in a substantially entire peripheral area of the vehicle body 1. There are two laser scanners 72 in total, specifically, one each ahead and behind the vehicle body 1, for detection of obstructions positioned in a forward travel direction and a backward travel direction of the vehicle body 1. There are four cameras 73 in total, specifically, one each ahead, behind, on the left, and on the right of the vehicle body 1, for capture of the entire peripheral area of the vehicle body 1. The four camels 73 according to the present embodiment output captured images serving as monitoring images with no processing, and also serving as overhead images processed through view point conversion. The obstruction sensors 7 according to the present embodiment include the ultrasonic sonars 71 and the laser scanners 72, each of which will be commonly called the "obstruction sensor" if there is no need for distinction therebetween.

Figure 3:
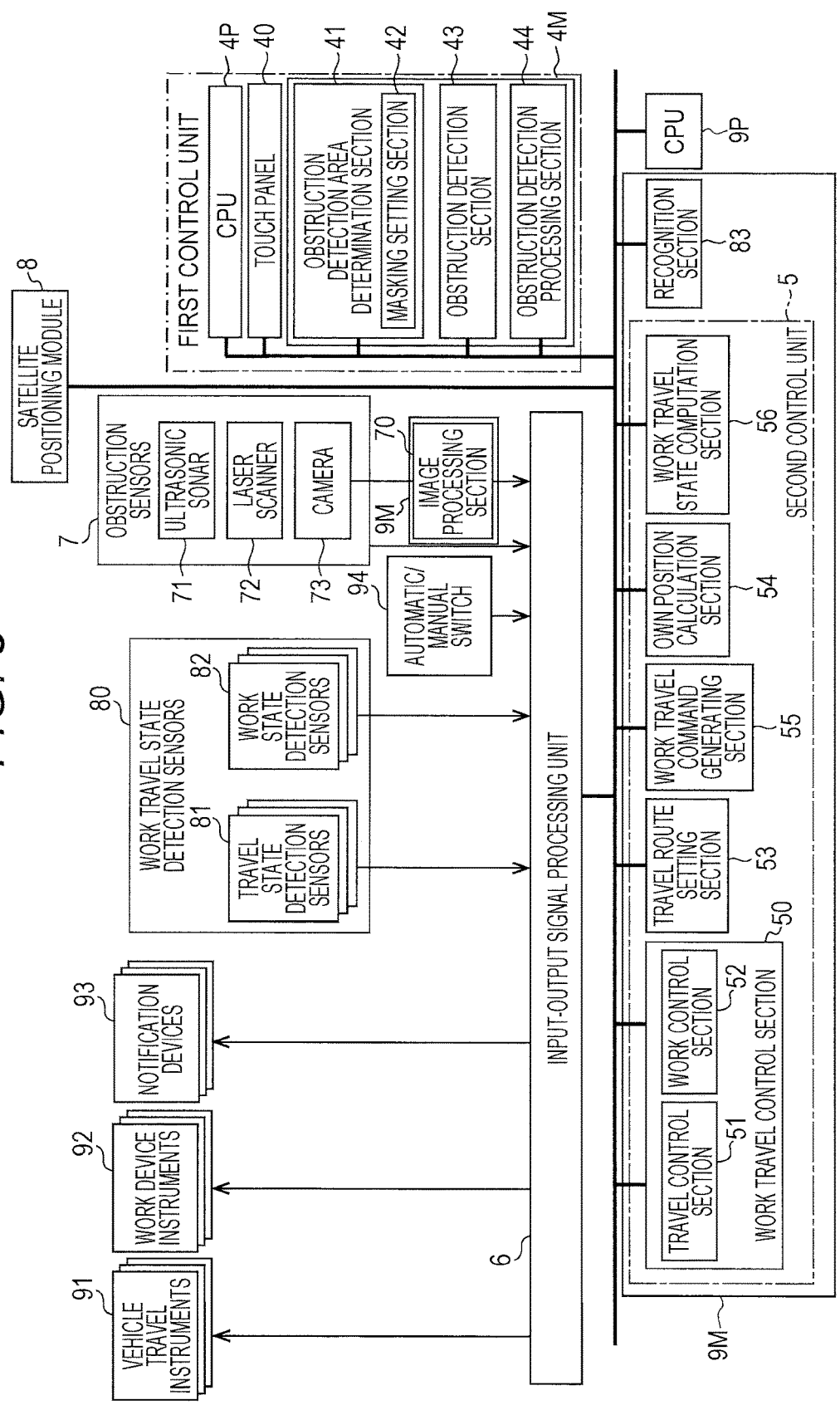
FIG. 3 illustrates a structure of the tractor.

FIG. 3 shows a control system structured in this tractor. The control system according to the present embodiment includes a first control unit 4 configured as the user operation terminal 4, a second control unit 5, and an input-output signal processing unit 6. The first control unit 4, the second control unit 5, and the input-output signal processing unit 6 are connected with one another by the on-vehicle LAN. The satellite positioning module 8 is also connected to the identical on-vehicle LAN. The first control unit 4 basically executes control of obstruction detection whereas the second control unit 5 executes basic control of travel and work of the tractor. The input-output signal processing unit 6 processes input-output signals relevant to work travel of the tractor. The control system of the tractor further includes various control units (e.g. an engine control unit) not shown in FIG. 3. These control units are connected via the on-vehicle LAN.

The input-output signal processing unit 6 is connected with the obstruction sensors 7. FIG. 3 shows the camera 73 connected with the input-output signal processing unit 6 via an image processing section 70 configured to execute processing such as generating a monitoring image or an overhead image from a captured image of the camera 73. Specifically, the vehicle body 1 includes a central processing unit (CPU) 9P and a memory 9M. A program of the image processing section 70 is stored in the memory 9M and executed by the CPU 9P to perform a function of the image processing section 70. The image processing section 70 can be provided in the input-output signal processing unit 6 or in the camera 73. In a case where the image processing section 70 has an obstruction detection function, the camera 73 and the image processing section 70 integrally configure one of constituent elements (obstruction sensor) of the obstruction sensors 7.

The input-output signal processing unit 6 is further connected with vehicle travel instruments 91, work device instruments 92, a notification device 93, an automatic/manual switch 94, travel state detection sensors 81, and work state detection sensors 82. The vehicle travel instruments 91 include the steering motor 14, as well as a control instrument attached to a transmission mechanism, an engine unit, or the like controlled for vehicle travel. The work device instruments 92 include a control instrument configured to drive the work device 30 and the lifting mechanism 31. The notification device 93 includes a display, a lamp, a speaker, and the like configured to notify a driver or an observer of an alert on work travel. The automatic/manual switch 94 is configured to select either an automatic travel mode for automatic steering travel or a manual travel mode for manual steering travel. For example, travel in the automatic steering mode is switched to manual steering travel by operating the automatic/manual switch 94, whereas manual steering travel is switched to automatic steering travel by operating the automatic/manual switch 94. The travel state detection sensors 81 include a vehicle speed sensor configured to detect travel speed (vehicle speed) of the vehicle body 1, a steering angle sensor configured to detect a steering angle of the front wheels 11, a rotational speed sensor configured to detect engine rotational speed, a transmission sensor configured to detect a transmission state, and the like. The work state detection sensors 82 include an orientation detection sensor configured to detect an orientation (a ground clearance and an inclination) of the work device 30, a driving state detection sensor configured to detect a driving/driven state of the work device 30, and the like. The travel state detection sensors 81 and the work state detection sensors 82 are collectively called the work travel state detection sensors 80 (at least one sensor 80) in this application.

This tractor is further provided with a recognition section 83 (one of the at least one state sensor) configured to recognize a model of the work device 30 mounted on the vehicle body 1. A Program of the recognition section 83 is stored in the memory 9M and executed by the CPU 9P to perform a function of the recognition section 83. The recognition section 83 has a function of mechanically or electronically reading an identification code of the work device 30 and obtaining, as recognition results, work device attribute values such as a type and a size of the work device from the read identification code.

Although not shown, the input-output signal processing unit 6 also includes a communication unit. The communication unit exchanges data with an external computer in conformity to a wireless communication standard or a wired communication standard. Examples of the external computer include a management computer provided at a distant place such as a management center, and a tablet computer and a smartphone (mobile phone) carried by a driver or an observer.

The first control unit 4 includes a touch panel 40 functioning as a graphic user interface. The first control unit 4 further includes an obstruction detection section 43, an obstruction detection area determination section 41, and an obstruction detection processing section 44 mainly configured by software. Specifically, the first control unit 4 includes a central processing unit (CPU) 4P (circuitry 4P) and a memory 4M. Programs of the obstruction detection section 43, the obstruction detection area determination section 41, and the obstruction detection processing section 44 are stored in the memory 4M and executed by the CPU 4P to perform functions of the obstruction detection section 43, the obstruction detection area determination section 41, and the obstruction detection processing section 44, respectively. The first control unit 4 detects an obstruction near the tractor in accordance with sensor signals from the obstruction sensors 7 and outputs a command for the tractor to take necessary action in consideration of a position and a size of the detected obstruction. A flow of control by the first control unit 4 will be described in detail later.

The second control unit 5 includes a work travel control section 50, a travel route setting section 53, an own position calculation section 54, a work travel command generating section 55, and a work travel state computation section 56. Specifically, programs of the work travel control section 50, the travel route setting section 53, the own position calculation section 54, the work travel command generating section 55, and the work travel state computation section 56 are stored in the memory 9M and executed by the CPU 9P to perform functions of the work travel control section 50, the travel route setting section 53, the own position calculation section 54, the work travel command generating section 55, and the work travel state computation section 56, respectively. The travel route setting section 53 develops into a readable state, in the memory 9M, a travel route as an automatic travel target route. The travel route can be generated at the tractor, or can be generated at a separate computer to be downloaded to the second control unit 5. The own position calculation section 54 (one of the at least one state sensor) calculates an own position as an on-map coordinate position of the vehicle body 1 in accordance with satellite positioning data transmitted from the satellite positioning module 8 having a GPS or the like. The work travel command generating section 55 obtains a displacement amount between the own position transmitted from the own position calculation section 54 and the travel route set by the travel route setting section 53 during automatic travel, and generates a travel command (including a steering command and a vehicle speed command) to reduce the displacement amount.

The work travel control section 50 includes a travel control section 51 and a work control section 52. The travel control section 51 has an automatic travel control function (the automatic travel mode) and a manual travel control function (a manual travel mode). When the automatic travel control mode is selected, the travel control section 51 transmits a control signal to each of the vehicle travel instruments 91 in accordance with the travel command from the work travel command generating section 55. The work control section 52 transmits a control signal to each of the work device instruments 92 in accordance with a work command from the work travel command generating section 55. When the manual travel mode is selected, manual travel is executed in accordance with operation of the steering wheel 22 by a driver. The work control section 52 similarly has an automatic work control function of automatically actuating the work device instruments 92, and a manual work control function of manually controlling the work device instruments 92 by means of various operation tools.

Figure 4:
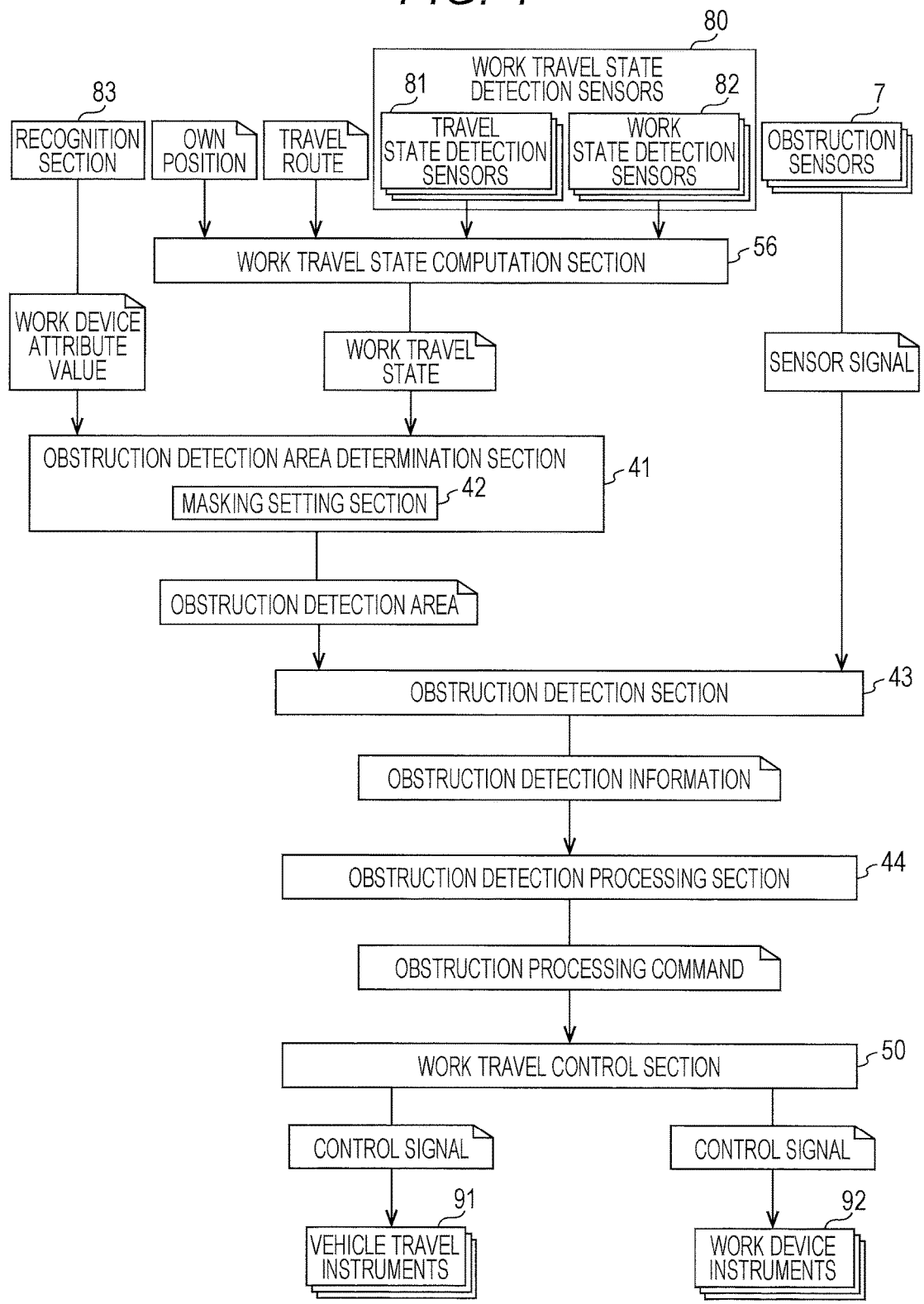
FIG. 4 is an explanatory flowchart showing a flow of control for adjustment of an obstruction detection area.

As shown in FIG. 4, the work travel state computation section 56 (one of the at least one state sensor) computes vehicle speed of the vehicle body 1, a steering angle of the front wheels 11, a lateral width of the work device 30, an orientation of the work device 30, and the like in accordance with sensor signals from the work travel state detection sensors 80, and transmits calculation results thereof as work travel state information (information of at least one state of the vehicle body 1 and the work device 30), to the obstruction detection area determination section 41 in the first control unit 4. The work travel state computation section 56 compares the own position from the own position calculation section 54 and the travel route from the travel route setting section 53, computes a travel distance or travel time to a next turn start position during straight travel, as well as a travel distance or travel time to a next straight travel start point during turn, to be included in the work travel state information. The work travel state computation section 56 can further have a limit distance calculation function of calculating, as a limit distance, a distance from the vehicle body 1 in a travel direction of the vehicle body 1 to a boundary of the work field. In this case, the limit distance is added to the work travel state information so that the obstruction detection area determination section can change the obstruction detection area in accordance with the limit distance.

Obstruction detection by the first control unit 4 will be described in detail next with reference to FIGS. 3 and 4. The obstruction detection section 43 which executes a core function of the obstruction detection detects, as an obstruction to be processed, only an obstruction positioned within the obstruction detection area determined by the obstruction detection area determination section 41. The obstruction detection area determination section 41 includes a masking setting section 42 having a function of masking a portion in the obstruction detection area. The masking setting section 42 masks a specific portion of the vehicle body 1 or the work device 30 entering the obstruction detection area to avoid detection of the specific portion as an obstruction.

The obstruction detection area determination section 41 receives, from the recognition section 83, the work device attribute values describing the type and the size of the work device 30 mounted on the vehicle body 1, and refers to the work device attribute values for computation of a basic obstruction detection area. In a case where the recognition section 83 is not provided, the work device attribute values are manually inputted through an input device (a work device type input interface).

Figure 5:
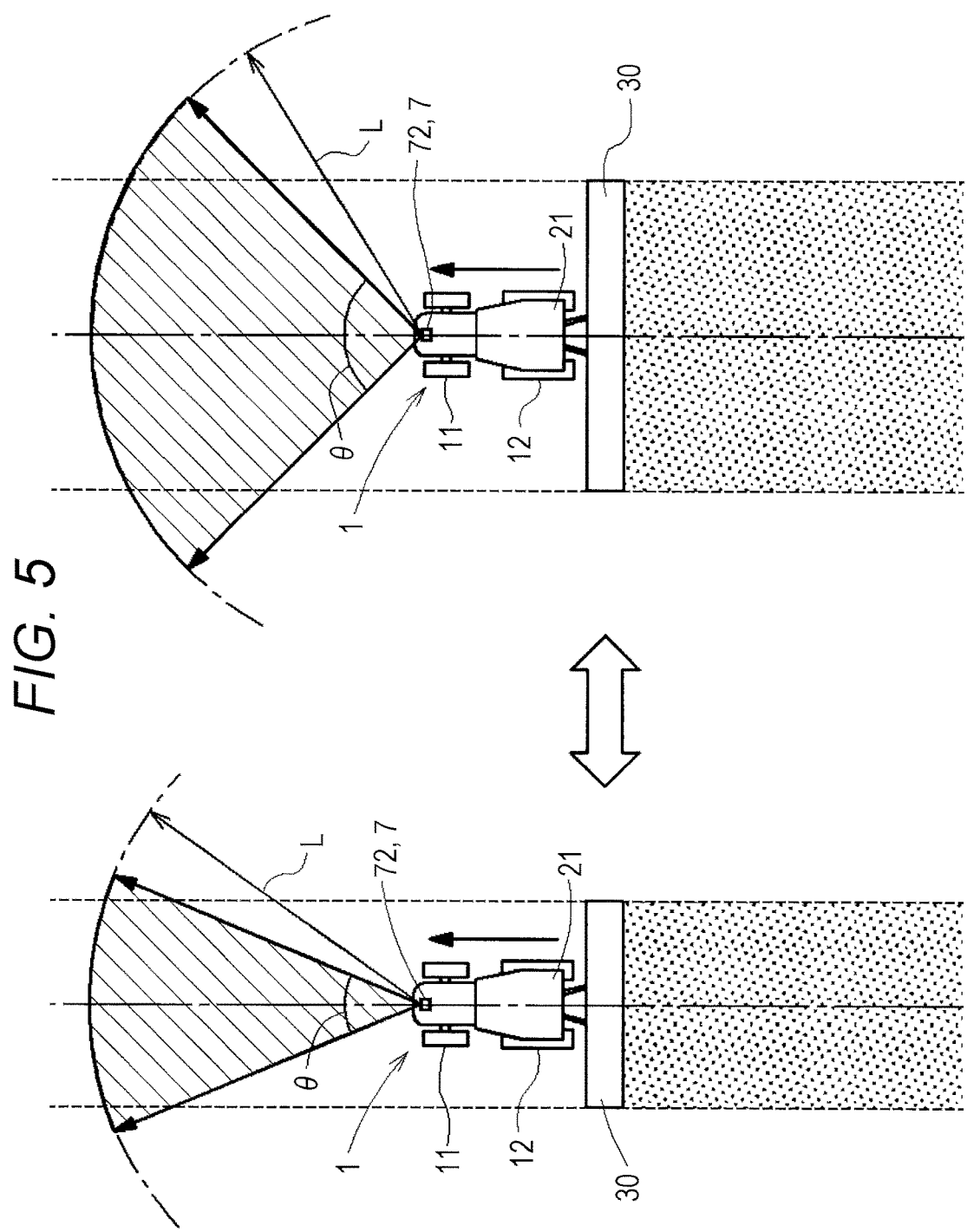
FIG. 5 is an explanatory view exemplifying the obstruction detection area changed in accordance with a work travel state.
Figure 6:
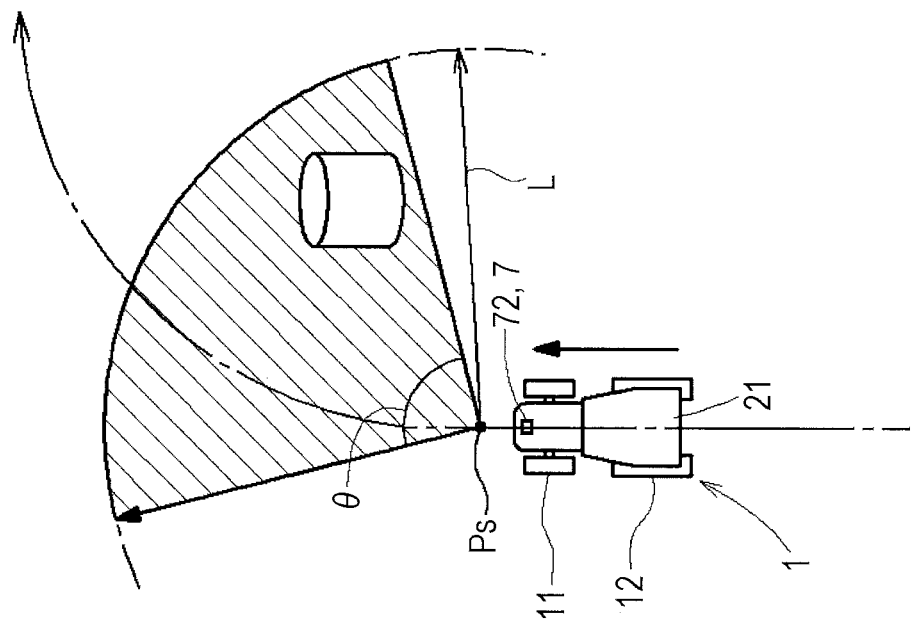
FIG. 6 is another explanatory view exemplifying the obstruction detection area changed in accordance with a work travel state.
Figure 6:
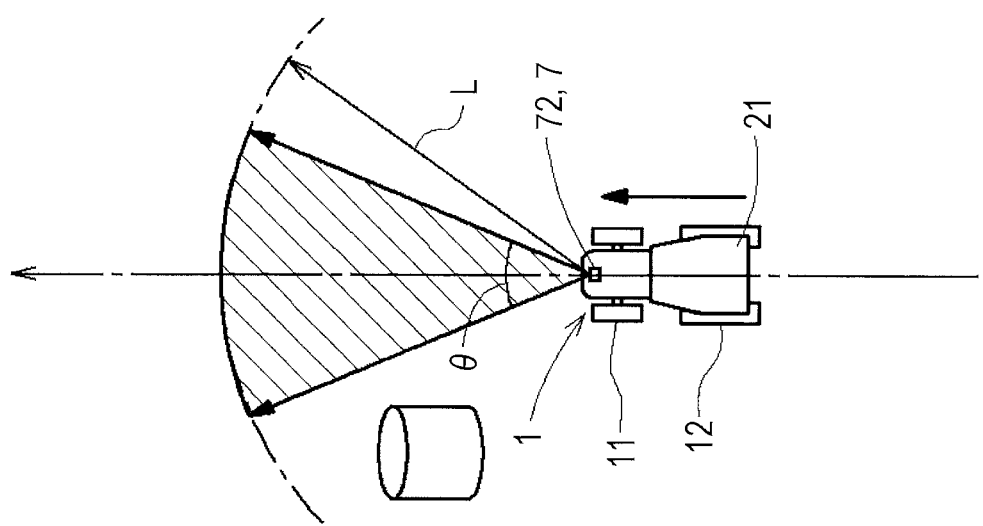
Figure 7:
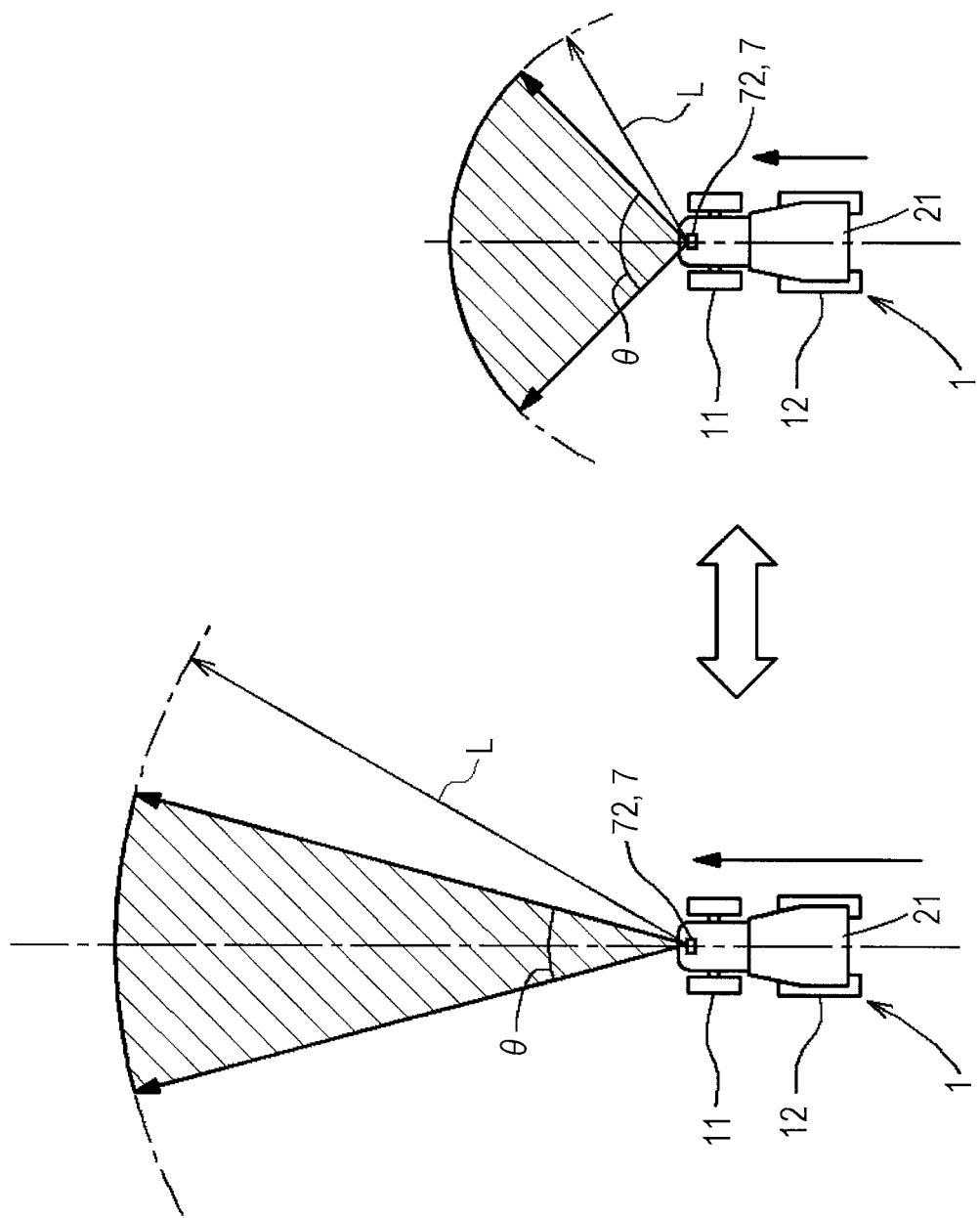
FIG. 7 is still another explanatory view exemplifying the obstruction detection area changed in accordance with a work travel state.

The obstruction detection area determination section 41 further refers to the work travel state information transmitted from the work travel state detection sensors 80 for determination of the obstruction detection area. In other words, the obstruction detection area is appropriately changed in accordance with the work travel state information. Exemplified below are obstruction detection area change rules for change of the obstruction detection area. FIGS. 5 to 7 illustrate the change rules. The obstruction sensor mentioned herein is the laser scanner 72 configured to execute rotary scan in the horizontal direction. The laser scanner thus has a fan-shaped scan field and a variable scan angle (indicated by reference sign θ in the figures) as a central angle of the fan-shaped scan field. Furthermore, this fan-shaped scan field is limited by a useful beam distance (a measurable distance) (indicated by reference sign L in the figures) to obtain an effective scan field, and the useful beam distance is also variable. FIGS. 5 to 8 indicate the effective scan field by diagonal lines.

(1) As shown in FIG. 5, when the lateral width of the vehicle body 1 of the tractor (a length of the vehicle body 1 in a vehicle transverse direction perpendicular to the travel direction of the tractor) is compared with the lateral width of the work device 30, the lateral width of the work device 30 (a length of the work device 30 in a transverse direction perpendicular to the travel direction of the tractor) is larger in most cases. An obstruction disturbing the tractor travelling straight is positioned within the lateral width of the work device 30. The obstruction detection area determination section 41 determines an obstruction detection area such that the effective scan field includes the lateral width of the work device 30. The work device 30 shown in the right half of FIG. 5 has the lateral width larger than the lateral width of the work device 30 shown in the left half thereof. The obstruction detection area indicated in the right half of FIG. 5 is thus larger than the obstruction detection area indicated in the left half of FIG. 5. In other words, the obstruction detection area indicated in the right half of FIG. 5 has the scan angle θ larger than the scan angle θ of the obstruction detection area indicated in the left half of FIG. 5. The obstruction detection area has portions outside a travel locus at lateral ends of the work device 30, and these portions can be masked by the masking setting section 42.

(2) FIG. 6 indicates change of the obstruction detection area upon transition from straight travel to turn travel. The work device 30 is not shown in this figure. This tractor travels along the preset travel route and thus enables calculation of transition timing from straight travel to turn travel. FIG. 6 has the right half showing the tractor continuously travelling straight, and the left half showing the tractor travelling straight and positioned before the tractor reaches the turn start position (indicated by reference sign Ps in the figure) by a predetermined distance. Ordinary straight travel indicated in the left half of FIG. 6 has a standard obstruction detection area set to have the scan angle θ of about 45°. In contrast, straight travel in an area immediately before the tractor reaches the turn start position (an area before the turn start position by the predetermined distance) indicated in the right half of FIG. 6 has an obstruction detection area expanded in a turning direction along the curved travel route. More specifically, the scan angle θ has a center line inclined to the turning direction from a longitudinal center line of the tractor so as to extend along a tangential line of the curved travel route, and the scan angle θ is enlarged to about 90°.

(3) FIG. 7 indicates a difference between an obstruction detection area during high-speed straight travel and an obstruction detection area during low-speed straight travel. Again, the work device 30 is not shown in this figure. According to this obstruction detection area change rule, the obstruction detection area during high-speed straight travel (the left half of FIG. 7) has the scan angle θ as relatively small as about 30°, but the fan-shaped scan field has the useful beam distance L set to be long. The obstruction detection area thus has a shape elongated in the travel direction. In contrast, the obstruction detection area during low-speed straight travel (the right half of FIG. 7) has the scan angle θ as relatively large as about 90°, but the fan-shaped scan field has the useful beam distance L set to be short. The obstruction detection area thus has a short shape with the large scan angle so as to enable reliable detection of an obstruction positioned near the forthcoming travel route.

Figure 8:
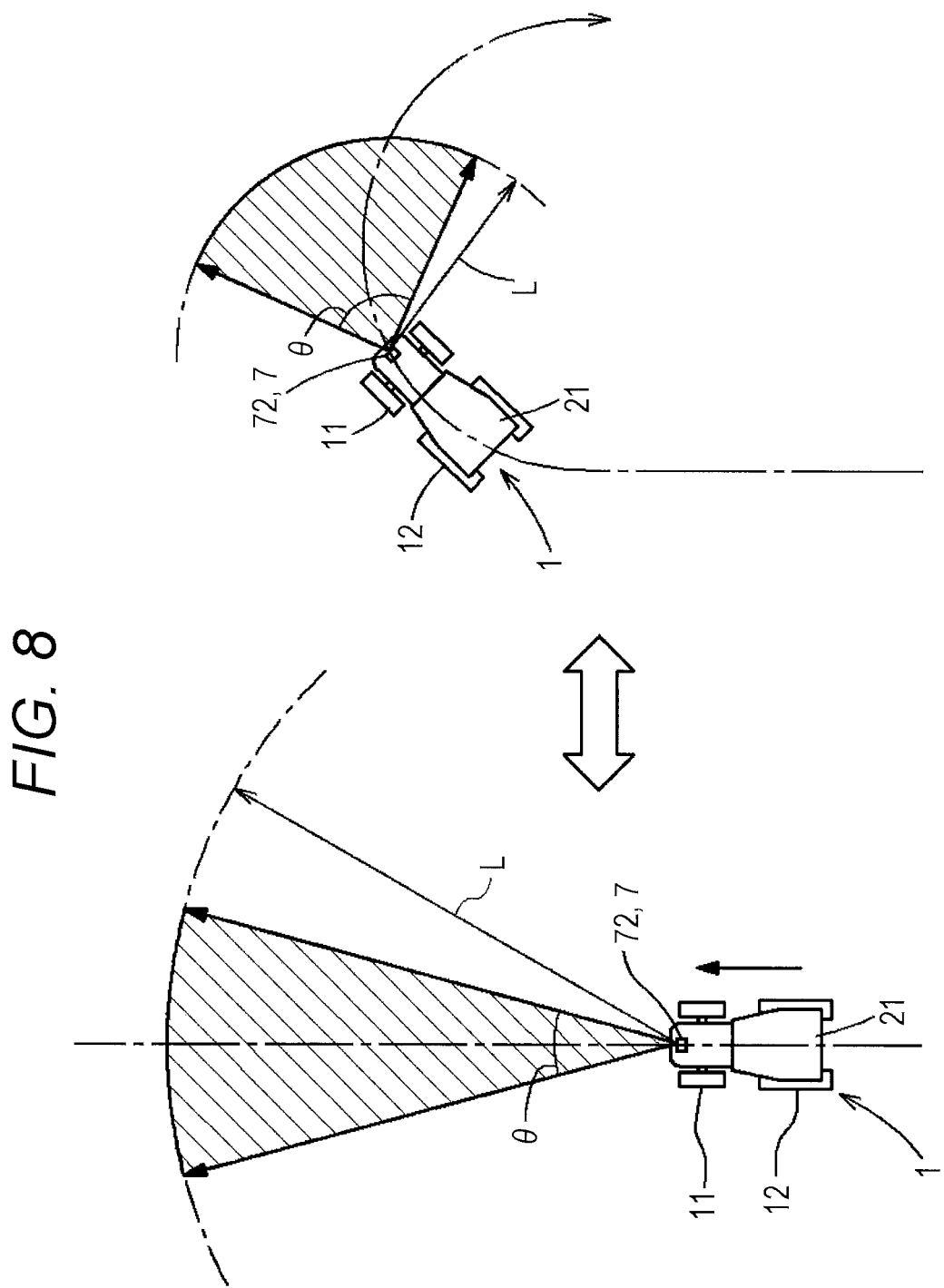
FIG. 8 is still another explanatory view exemplifying the obstruction detection area changed in accordance with a work travel state.

(4) FIG. 8 indicates a difference between an obstruction detection area during straight travel and an obstruction detection area during turn travel. Again, the work device 30 is not shown in this figure. According to this obstruction detection area change rule, the obstruction detection area during straight travel (the left half of FIG. 8) is set to have the shape elongated in the travel direction as already described in (3). In contrast, the obstruction detection area during turn travel (the right half of FIG. 8) has the scan angle θ as wide as about 90°, but the fan-shaped scan field has the useful beam distance L set to be short. However, the center line of the scan angle θ is not inclined to the turning direction from the longitudinal center line of the tractor to incline the obstruction detection area as already described in (1). Specifically, the obstruction detection area during turn travel is set to enable more reliable detection of an obstruction positioned near the forthcoming travel route in comparison to the obstruction detection area during straight travel.

(5) Although not shown, assume a case where the limit distance is added to the work travel state information. The shorter limit distance expands the scan angle θ of the obstruction detection area and shortens the useful beam distance L of the fan-shaped scan field.

Any of the obstruction detection area change rules described above can be combined appropriately. It is also possible to select or modify the obstruction detection area change rules automatically or manually in accordance with a type of work.

The laser scanner 72 is described as the obstruction sensor with reference to the figures in the above obstruction detection area change rules. Any other obstruction sensor is applicable to change of the obstruction detection area according to a purpose similar to those of the rules. For example, the obstruction detection area is changed in accordance with the detected work travel state in order to expand an area highly possibly including a travel obstruction and reduce an area less possibly including a travel obstruction.

The obstruction detection area determined by the obstruction detection area determination section 41 is transmitted to the obstruction detection section 43. If the position of an obstruction computed in accordance with the sensor signals from the obstruction sensors 7 is included in the obstruction detection area, the obstruction detection section 43 determines that an obstruction is detected, generates obstruction detection information including an ID of the obstruction sensor detecting the obstruction, the position of the detected obstruction, a width of the detected obstruction, and the like, and transmits the obstruction detection information to the obstruction detection processing section 44. The obstruction detection processing section 44 determines contents of processing to the detected obstruction in accordance with the obstruction detection information. Examples of the processing contents include slowdown of the vehicle body 1, stop of the vehicle body, detour travel to avoid the obstruction, switch to manual travel, and the like. When the processing contents are determined, an obstruction processing command for execution of the processing contents is prepared and is transmitted to the work travel control section 50. The obstruction detection processing section 44 further generates and transmits obstruction detection notification data to the notification device 93, for notification of obstruction detection according to the obstruction detection information. The obstruction detection information and the obstruction detection notification data can be transmitted to outside the tractor via the input-output signal processing unit 6.

The work travel control section 50 transmits a control signal to each of the vehicle travel instruments 91 and each of the work devices instruments 92 in accordance with the obstruction processing command transmitted from the obstruction detection processing section 44. The tractor is thus controlled in accordance with the obstruction processing command.

Other Embodiments (1) The above embodiment exemplifies the tractor equipped with the tilling device as a work vehicle. The embodiment of the present invention is also applicable to a tractor equipped with the work device 30 other than the tilling device, as well as to an agricultural work machine such as a combine harvester or a rice transplanter, and to a construction machine.

(2) The obstruction detection area determination section 41 according to the above embodiment determines the obstruction detection area in accordance with the work travel state based on detection results of the work travel state detection sensors 80. The obstruction detection area determination section can alternatively have a function of forcibly changing the obstruction detection area in accordance with input through an input device such as the touch panel 40 operated by a user.

(3) The first control unit 4, the second control unit 5, and the input-output signal processing unit 6 according to the above embodiment are connected via the on-vehicle LAN and are included in the tractor. The first control unit 4 can alternatively be configured as a tablet computer, a notebook computer, a smartphone, or the like, which is carried by a manager and wirelessly exchanges data with the control system of the tractor. The first control unit 4 can still alternatively be disposed at a distant place such as a management center or a user's residence, and be configured as a computer connected with the control system of the tractor via the Internet or the like.

(4) The diagram of FIG. 3 exemplifies the units categorized for easier description. These units can be modified appropriately by integrating some of the units or dividing one of the programs into a plurality of units.

INDUSTRIAL APPLICABILITY

The embodiment of the present invention is applicable to an automatic travelling work vehicle configured to execute work travel along a travel route.

According to the embodiment of the present invention, an automatic travelling work vehicle configured to execute work travel along a travel route includes: a vehicle body equipped with a work device; a work travel control section configured to control work travel; work travel state detection sensors configured to detect a work travel state; at least one obstruction sensor configured to detect an obstruction disturbing travel; an obstruction detection section configured to detect an obstruction positioned within an obstruction detection area in accordance with a sensor signal from the obstruction sensor; and an obstruction detection area determination section configured to determine the obstruction detection area in accordance with the work travel state detected by the work travel state detection sensors.

According to this configuration, the obstruction detection area for detection of an obstruction by the obstruction sensor is determined in accordance with the work travel state detected by the work travel state detection sensors detecting states of the work device and the vehicle body. The obstruction detection area can thus be appropriately changed in accordance with the state of the work device and the state of the vehicle body. This enables detection of an obstruction within the obstruction detection area suited for the current states of the work device and the vehicle body before and during work travel.

A width (lateral width) in a vehicle transverse direction perpendicular to a travel direction of the work vehicle is important upon detection of an obstruction disturbing travel of the work vehicle. The work device mounted on the vehicle body often has a lateral width larger than the lateral width of the vehicle body for achievement of higher work efficiency. The lateral width of the work device may be changed in accordance with the feature of a work field, or may be changed during work travel. In view of this, according to an embodiment of the present invention, the work travel state includes a lateral width of the work device in a vehicle transverse direction perpendicular to a travel direction of the vehicle body. The obstruction detection area is changed in accordance with the lateral width of the work device detected by the work travel state detection sensors. According to this configuration, even in a case where the vehicle body is equipped with selected various work devices having various lateral widths, the obstruction detection area can be set appropriately to achieve obstruction detection. The lateral width of the work device smaller than the width of the vehicle body is obviously regarded as the width of the vehicle body.

In a case where a selectively used work device is already determined, it is convenient to preliminarily register the lateral width of the work device and obtain the lateral width of the work device in accordance with a type of the mounted work device. The type of the mounted work device can be easily obtained in accordance with a recognition method using an ID code or the like. In view of this, the automatic travelling work vehicle according to an embodiment of the present invention further includes: a recognition section configured to recognize a type of the work device; in which the recognition section transmits, to the obstruction detection area determination section, a lateral width of the work device according to the recognized type as the work travel state.

In a case where the work device has an unknown lateral width, a user needs to find the lateral width of the work device, particularly lengths of portions projecting from the right and left ends of the vehicle body by referring to a specification document or the like, or actually measure the lengths and manually input the lengths. In order to deal with such a case, according to an embodiment of the present invention, a lateral width of the work device is manually inputted by a user, and the inputted lateral width of the work device is transmitted to the obstruction detection area determination section as the work travel state. In a case where the lengths of the portions projecting from the right and left ends of the vehicle body are different from each other, this application provides obtaining a lateral width displaced from the center of the vehicle body in consideration of such lengths of the portions projecting from the right and left ends of the vehicle body. The obtained lateral width is also regarded as the lateral width according to this application.

In a case where the work device changes an orientation with respect to the vehicle body during work travel, interference with an obstruction is positionally changed in accordance with orientation change by a lifting mechanism, a turning mechanism, or the like. In view of this, according to an embodiment of the present invention, the work travel state detection sensors include an orientation detection sensor configured to detect an orientation of the work device with respect to the vehicle body, and the orientation is transmitted to the obstruction detection area determination section as the work travel state. According to this configuration, even when a portion interfering with an obstruction is displaced during work travel in accordance with orientation change of the work device, the obstruction detection area is appropriately changed in accordance with the displacement. This achieves precise detection of only an obstruction disturbing travel.

High travel speed (vehicle speed) of the vehicle body shortens time to reach an obstruction and reduces available time to avoid the obstruction. The obstruction detection area is thus preferable to be elongated in the travel direction at high vehicle speed and be shortened in the travel direction at low vehicle speed. The vehicle body highly possibly turns left or right at low vehicle speed rather than at high vehicle speed, in other words, the vehicle body is often reduced in speed before turning. The obstruction detection area is thus preferable to be elongated in the vehicle transverse direction in this case. In view of this, according to an embodiment of the present invention, the work travel state detection sensors include a vehicle speed sensor configured to detect travel speed of the vehicle body, and the travel speed is transmitted to the obstruction detection area determination section as the work travel state.

In a case where the travel route of the automatic travelling work vehicle is entirely included in the work field, there is no need to detect any obstruction positioned outside the work field. In view of this, according to an embodiment of the present invention, a distance from the vehicle body to a boundary of a work field in the travel direction of the vehicle body is calculated as a limit distance, and the obstruction detection area determination section changes the obstruction detection area in accordance with the limit distance. This configuration avoids defective detection of any unnecessary obstruction.

In a case where the work vehicle travels in accordance with a preset and expected travel route and an own position calculated promptly, it is possible to calculate an estimated locus of forthcoming travel. In other words, it is possible to calculate a distance to a position of orientation change (such as turn) of the work vehicle or travel time to the position. The obstruction detection area can thus be obtained in consideration of an obstruction appearing in a turning direction upon turning. In view of this, the automatic travelling work vehicle according to an embodiment of the present invention further includes: an own position calculation section configured to calculate an own position in accordance with satellite positioning data; in which the obstruction detection area determination section expands the obstruction detection area in a turning direction at a position before the work vehicle reaches a turn start position of the vehicle body calculated from the travel route and the own position. This configuration advantageously achieves expansion of the obstruction detection area in the turning direction before the vehicle body turns, instead of expansion of the obstruction detection area in the turning direction with a trigger of steering with steering control wheels as in the conventional art. This configuration enables quick detection of an obstruction approaching in the turning direction.

Upon detection of an obstruction in an area quite close to the work vehicle, the vehicle body of the work vehicle or the work device mounted on the work vehicle is overlapped with the obstruction detection area. In view of this, according to an embodiment of the present invention, the obstruction detection area determination section has a masking function of masking portions positioned within the obstruction detection area, of the vehicle body and the work device. This configuration avoids detection, as an obstruction, any portion of the vehicle body or the work device entering the obstruction detection area by masking the portion, because the obstruction detection area has a simple geometrical shape due to reduction of arithmetic processing or limitation to actuation of a scanning mechanism. In a case where a positionally displaceable work device is mounted, a masked range is conveniently changed in accordance with the orientation change of the work device.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
   a vehicle body to which a work device is attachable, the work device having a lateral width in a vehicle transverse direction perpendicular to a travel direction of the work vehicle;
   at least one obstruction sensor provided on the vehicle body to detect an obstruction; and
   circuitry configured to
      determine an obstruction detection area such that the obstruction detection area increases in the vehicle transverse direction as the lateral width increases, and
      determine whether the obstruction detected by the at least one obstruction sensor exists within the obstruction detection area.

2. The work vehicle according to claim 1, wherein the at least one obstruction sensor includes a laser scanner having a scan angle such that the scan angle increases as the lateral width of the work device increases.

3. The work vehicle according to claim 1, further comprising:
   a work device detection sensor to detect a type of the work device,
   wherein the circuitry is configured to determine the lateral width of the work device according to the type of the work device.

4. The work vehicle according to claim 1, further comprising:
   a work device type input interface via which the lateral width of the work device is input,
   wherein the lateral width of the work device is transmitted to the circuitry.

5. The work vehicle according to claim 1, further comprising:
   an orientation detection sensor to detect an orientation of the work device with respect to the vehicle body,
   wherein the orientation is transmitted to the circuitry.

6. A work vehicle comprising:
   a vehicle body to which a work device is attachable;
   at least one obstruction sensor provided on the vehicle body to detect an obstruction;
   a vehicle speed sensor to detect travel speed of the work vehicle in a travel direction of the work vehicle; and
   circuitry configured to
      determine an obstruction detection area such that the obstruction detection area increases in the travel direction as the travel speed detected by the vehicle speed sensor increases, and determine whether the obstruction detected by the at least one obstruction sensor exists within the obstruction detection area.

7. The work vehicle according to claim 1, further comprising:
at least one state sensor to calculate a distance from the vehicle body to a boundary of a work field in the travel direction of the vehicle body as a limit distance,
wherein the circuitry is configured to change the obstruction detection area based on the limit distance.

8. A work vehicle comprising:
a vehicle body to which a work device is attachable;
a memory to store a travel route along which the work vehicle is to travel;
at least one obstruction sensor provided on the vehicle body to detect an obstruction;
at least one state sensor provided on the vehicle body and/or the work device to detect at least one state of the vehicle body and the work device; and
circuitry configured to
calculate, as the at least one state, a position of the work vehicle in the travel route based on satellite positioning data,
determine an obstruction detection area based on the at least one state detected by the at least one state sensor to expand the obstruction detection area toward a side to which the work vehicle is to turn along the travel route,
determine whether the obstruction detected by the at least one obstruction sensor exists within the obstruction detection area.

9. The work vehicle according to claim 1, wherein the circuitry is configured to mask portions of the vehicle body and the work device which are positioned within the obstruction detection area.

10. The work vehicle according to claim 1, wherein the circuitry is configured to control the vehicle body to travel based on a travel route automatically.

11. The work vehicle according to claim 1, wherein the circuitry is configured to control the work device to work automatically.

12. The work vehicle according to claim 1, wherein the vehicle transverse direction is perpendicular to the travel direction while the work vehicle travels along a substantially straight line.

13. The work vehicle according to claim 1, further comprising:
a state sensor provided on the vehicle body or the work device to detect the lateral width of the work device, wherein the circuitry is configured to obtain the lateral width detected by the state sensor.

14. The work vehicle according to claim 6,
wherein the at least one obstruction sensor includes a laser scanner having a scan angle and a measurable distance such that the scan angle decreases and the measurable distance increases as the travel speed increases.

15. The work vehicle according to claim 8,
wherein the at least one obstruction sensor includes a laser scanner having a scan angle such that a bisector of the scan angle turns to the side when the obstruction detection area is expanded toward the side.

16. The work vehicle according to claim 15,
wherein the laser scanner has a first measurable distance that is determined when the work vehicle travels straightly and a second measurable distance that is determined when the work vehicle turns, the second measurable distance being shorter than the first measurable distance,
wherein the laser scanner has an additional scan angle that is determined when the work vehicle travels straightly, the additional scan angle being smaller than the scan angle.

17. The work vehicle according to claim 8, wherein the circuitry is configured to expand the obstruction detection area toward the side to which the work vehicle is to turn before the work vehicle starts turning to the side along the travel route.

\* \* \* \* \*